United States Patent
Shin et al.

(10) Patent No.: US 9,625,777 B2
(45) Date of Patent: Apr. 18, 2017

(54) LIQUID CRYSTAL DISPLAY

(71) Applicant: SAMSUNG DISPLAY CO., LTD., Yongin, Gyeonggi-Do (KR)

(72) Inventors: Dong Hee Shin, Cheonan-si (KR); Youn Hak Jeong, Cheonan-si (KR); Ho Jun Lee, Cheonan-si (KR); Yoo Mi Ra, Ansan-si (KR); Kee-Bum Park, Cheonan-si (KR); Hong Min Yoon, Seoul (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 184 days.

(21) Appl. No.: 14/547,575

(22) Filed: Nov. 19, 2014

(65) Prior Publication Data

US 2015/0160524 A1  Jun. 11, 2015

(30) Foreign Application Priority Data

Dec. 6, 2013 (KR) .................. 10-2013-0151801

(51) Int. Cl.
*G02F 1/1362* (2006.01)
*G02F 1/1343* (2006.01)

(52) U.S. Cl.
CPC .... *G02F 1/136213* (2013.01); *G02F 1/13624* (2013.01); *G02F 2001/134345* (2013.01); *G02F 2001/136218* (2013.01)

(58) Field of Classification Search
CPC .................................. G02F 1/13624
See application file for complete search history.

(56) References Cited

U.S. PATENT DOCUMENTS

| | | | |
|---|---|---|---|
| 6,400,427 B1 | 6/2002 | Hanazawa et al. | |
| 7,142,274 B2 | 11/2006 | Kitagawa et al. | |
| 7,671,942 B2 | 3/2010 | Nam et al. | |
| 2009/0225250 A1* | 9/2009 | Lyu | G02F 1/134363 349/44 |

(Continued)

FOREIGN PATENT DOCUMENTS

| | | |
|---|---|---|
| KR | 1020060120917 | 11/2006 |
| KR | 1020070073171 | 7/2007 |

(Continued)

*Primary Examiner* — Patrick Edouard
*Assistant Examiner* — Matthew Yeung
(74) *Attorney, Agent, or Firm* — F. Chau & Associates, LLC

(57) ABSTRACT

A liquid crystal display includes a substrate, a gate line, a data line, first and second reference voltage lines disposed on the substrate, first and second subpixel electrodes disposed in one pixel area, and first to third switching elements. The first and second reference voltage lines apply first and second reference voltages. The first and second subpixel electrodes include a plate portion and a plurality of branch portions extending from the plate portion. The first and second reference voltage lines include a first portion overlapping the first subpixel electrode and the second subpixel electrode. The first portion overlaps the plate portion of the first and second subpixel electrodes. A voltage difference between the first subpixel electrode and a common voltage is larger than a voltage difference between the second subpixel electrode and the common voltage.

16 Claims, 11 Drawing Sheets

(56) References Cited

U.S. PATENT DOCUMENTS

| | | | | |
|---|---|---|---|---|
| 2010/0103339 A1* | 4/2010 | Shimoshikiryoh | .. | G09G 3/3648 |
| | | | | 349/39 |
| 2011/0089424 A1 | 4/2011 | Hur et al. | | |
| 2012/0212686 A1* | 8/2012 | Kimura | ...... | G02F 1/13624 |
| | | | | 349/42 |
| 2013/0235091 A1* | 9/2013 | Tsai | ...... | G09G 3/003 |
| | | | | 345/690 |

FOREIGN PATENT DOCUMENTS

| | | |
|---|---|---|
| KR | 1020080040478 | 5/2008 |
| KR | 1020080044047 | 5/2008 |
| KR | 1020090054300 | 5/2009 |
| KR | 100997974 | 11/2010 |
| KR | 101107679 | 1/2012 |

\* cited by examiner

LIQUID CRYSTAL DISPLAY

CROSS-REFERENCE TO RELATED APPLICATIONS

This application claims priority under 35 U.S.C. §119 to Korean Patent Application No. 10-2013-0151801 filed on Dec. 6, 2013, the disclosure of which is incorporated by reference herein in its entirety.

TECHNICAL FIELD

Exemplary embodiments of the present invention relate to a liquid crystal display.

DISCUSSION OF THE RELATED ART

Liquid crystal displays (LCDs) are one of the most widely used flat panel displays. An LCD includes a pair of panels provided with field-generating electrodes, such as pixel electrodes and a common electrode, and a liquid crystal (LC) layer interposed between the two panels. The LCD displays images by applying voltages to the field-generating electrodes to generate an electric field in the LC layer that determines the orientations of LC molecules to adjust polarization of incident light.

A vertical alignment (VA) mode LCD, which aligns LC molecules such that their long axes are perpendicular to the panels in the absence of an electric field, provides a high contrast ratio and wide reference viewing angle. The reference viewing angle may correspond to a contrast ratio of 1:10, or a critical angle of gray-to-gray luminance reversion.

SUMMARY

Exemplary embodiments of the present invention provide a liquid crystal display capable of expressing an accurate gray in a low gray region while side visibility is close to front visibility, preventing luminance from being decreased compared to a driving voltage, and preventing or reducing display quality deterioration such as light leakage.

According to an exemplary embodiment of the present invention, a liquid crystal display includes a first substrate, a gate line disposed on the first substrate, a data line disposed on the first substrate, a first reference voltage line and a second reference voltage line disposed on the first substrate and applying a first reference voltage and a second reference voltage, a first subpixel electrode and a second subpixel electrode disposed in one pixel area, a first switching element connected to the gate line, the data line, and the first subpixel electrode, a second switching element connected to the gate line, the data line, and the second subpixel electrode, and a third switching element connected to the gate line, the first subpixel electrode, and one of the first and second reference voltage lines. The first subpixel electrode and the second subpixel electrode include a whole plate portion and a plurality of branch electrodes extending from the whole plate portion. The first reference voltage line and the second reference voltage line include a first portion overlapping the first subpixel electrode and the second subpixel electrode. The first portion overlaps the whole plate portion of the first subpixel electrode and the second subpixel electrode. A voltage difference between the first subpixel electrode and a common voltage is larger than a voltage difference between the second subpixel electrode and the common voltage.

The liquid crystal display may further include a second substrate facing the first substrate, and a common electrode formed on the second substrate and applied with the common voltage. The common electrode may have a cross-shaped cutout, and the first portion of the first reference voltage line and the second reference voltage line may overlap the cross-shaped cutout.

The liquid crystal display may further include a shielding electrode formed on the first substrate, overlapping the data line, extending substantially parallel to the data line, and applied with a voltage having substantially the same magnitude as the common voltage.

The first reference voltage or the second reference voltage applied to the reference voltage line connected to the third switching element from among the first reference voltage line and the second reference voltage line, and a data voltage applied to the data line, may have the same polarity as the common voltage.

Polarities of the first reference voltage and the second reference voltage may be changed for each frame while having a predetermined magnitude.

According to an exemplary embodiment of the present invention, a liquid crystal display includes a first substrate, a gate line disposed on the first substrate, a data line disposed on the first substrate, a first reference voltage line and a second reference voltage line disposed on the first substrate and applying a first reference voltage and a second reference voltage, a first subpixel electrode and a second subpixel electrode disposed in one pixel area, a first switching element connected to the gate line, the data line, and the first subpixel electrode, a second switching element connected to the gate line, the data line, and the second subpixel electrode, a third switching element connected to the gate line, the first subpixel electrode, and one of the first reference voltage line and the second reference voltage line, a second substrate facing the first substrate, and a common electrode formed on the second substrate and applied with a common voltage. The first subpixel electrode and the second subpixel electrode include a whole plate portion and a plurality of branch electrodes extending from the whole plate portion. The first reference voltage line and the second reference voltage line include a first portion overlapping the first subpixel electrode and the second subpixel electrode. The first portion of the first reference voltage line and the second reference voltage line overlaps a cross-shaped cutout. A voltage difference between the first subpixel electrode and the common voltage is larger than a voltage difference between the second subpixel electrode and the common voltage.

According to an exemplary embodiment of the present invention, a liquid crystal display includes a first substrate, a gate line disposed on the first substrate, a data line disposed on the first substrate, a first reference voltage line disposed on the first substrate and applying a first reference voltage, a second reference voltage line disposed on the first substrate and applying a second reference voltage, a first subpixel electrode and a second subpixel electrode disposed in one pixel area and separated by the gate line, a first switching element connected to the gate line, the data line, and the first subpixel electrode, a second switching element connected to the gate line, the data line, and the second subpixel electrode, and a third switching element connected to the gate line, the first subpixel electrode, and one of the first reference voltage line and the second reference voltage line. The first subpixel electrode and the second subpixel electrode each include a plate portion and a plurality of branch electrodes extending from the plate portion. The first reference voltage line includes a first portion overlapping the plate portion of the first subpixel electrode. The second reference voltage line includes a first portion overlapping the plate portion of the second subpixel electrode. A voltage difference between the first subpixel electrode and a common voltage is larger than a voltage difference between the second subpixel electrode and the common voltage.

According to an exemplary embodiment of the present invention, a liquid crystal display includes a first substrate, a gate line disposed on the first substrate, a data line disposed on the first substrate, a first reference voltage line disposed on the first substrate and applying a first reference voltage, a second reference voltage line disposed on the first substrate and applying a second reference voltage, a first subpixel electrode and a second subpixel electrode disposed in one pixel area and separated by the gate line, a first switching element connected to the gate line, the data line, and the first subpixel electrode, a second switching element connected to the gate line, the data line, and the second subpixel electrode, a third switching element connected to the gate line, the first subpixel electrode, and one of the first reference voltage line and the second reference voltage line, a second substrate facing the first substrate, and a common electrode formed on the second substrate and applied with a common voltage. The first subpixel electrode and the second subpixel electrode each include a plate portion and a plurality of branch electrodes extending from the plate portion. The first reference voltage line includes a first portion overlapping the first subpixel electrode and a cross-shaped cutout of the common electrode. The second reference voltage line includes a first portion overlapping the second subpixel electrode and the cross-shaped cutout of the common electrode. A voltage difference between the first subpixel electrode and the common voltage is larger than a voltage difference between the second subpixel electrode and the common voltage.

According to an exemplary embodiment of the present invention, a liquid crystal display includes a first substrate, a gate line disposed on the first substrate, a data line disposed on the first substrate, a first reference voltage line disposed on the first substrate and applying a first reference voltage, a second reference voltage line disposed on the first substrate and applying a second reference voltage, and a first subpixel electrode and a second subpixel electrode disposed in one pixel area and separated by the gate line. The first reference voltage line includes a first portion overlapping the first subpixel electrode. The second reference voltage line includes a first portion overlapping the second subpixel electrode. A voltage difference between the first subpixel electrode and a common voltage is larger than a voltage difference between the second subpixel electrode and the common voltage.

According to exemplary embodiments of the present invention, in a liquid crystal display, an accurate gray may be expressed in a low gray region while side visibility is close to front visibility, luminance may be prevented from being decreased compared to a driving voltage, and display quality deterioration such as light leakage may be prevented or reduced.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EXEMPLARY EMBODIMENTS

Figure 1:
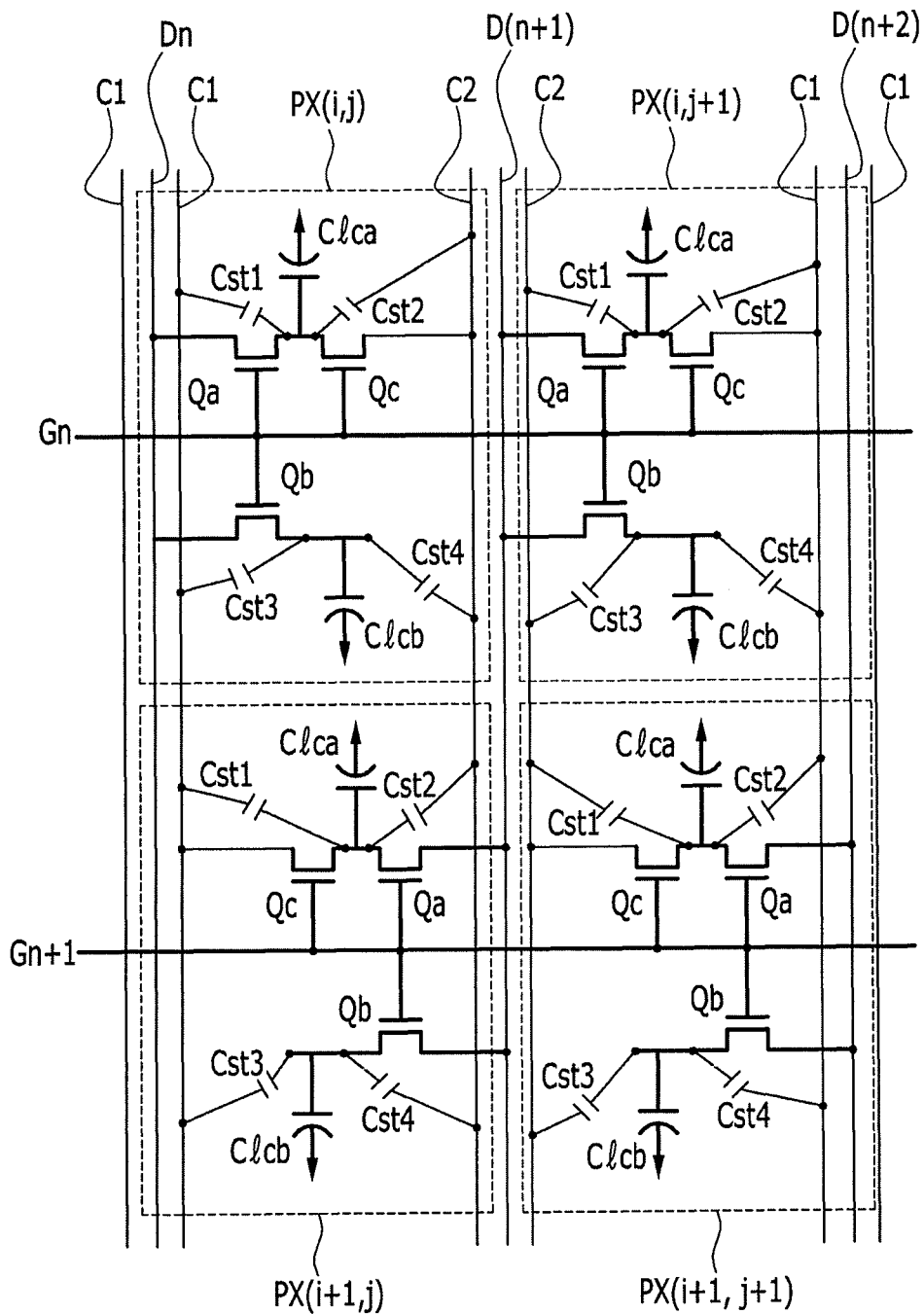
FIG. 1 is an equivalent circuit diagram of four pixels of a liquid crystal display according to an exemplary embodiment of the present invention.

Exemplary embodiments of the present invention will be described more fully hereinafter with reference to the accompanying drawings. Like reference numerals may refer to like elements throughout the accompanying drawings.

In the drawings, the thickness of layers, films, panels, regions, etc., may be exaggerated for clarity. It will be understood that when an element such as a layer, film, region, or substrate is referred to as being "on" another element, it can be directly on the other element or intervening elements may also be present.

Referring to a vertically aligned mode liquid crystal display (LCD), one pixel may be divided into two subpixels, and a voltage of either subpixel may be lowered. As a result, voltages of the two subpixels are different from each other such that transmittances thereof are different from each other, and side visibility may be made closer to front visibility. However, when one pixel is divided into two subpixels in this manner, luminance at the side may be increased relative to the front in a low gray state, and thus, a gray in a low gray region may not be accurately displayed. Further, the entire luminance may be lowered relative to the applied pixel voltage, and as a result, driving efficiency may be decreased. In addition, the common voltage may be affected by a signal wire used to input signals having different polarities with respect to the common voltage to each pixel area, thereby causing display quality deterioration such as, for example, light leakage in the pixel area.

Layouts of signal lines and pixels of a liquid crystal display according to an exemplary embodiment of the present invention, and a driving method thereof, will be described with reference to FIG. 1.

FIG. 1 is an equivalent circuit diagram of four pixels of a liquid crystal display according to an exemplary embodiment of the present invention.

Referring to FIG. 1, a liquid crystal display according to an exemplary embodiment of the present invention includes a first pixel PX(i, j) and a second pixel PX(i, j+1), which are adjacent to each other in a pixel row direction, a third pixel PX (i+1, j) and a fourth pixel PX(i+1, j+1), which are adjacent to the first pixel PX(i, j) and the second pixel PX(i, j+1) in a pixel column direction. The liquid crystal display further includes a plurality of signal lines Gn, Gn+1, Dn, D(n+1), D(n+2), C1, and C2 which are connected thereto.

The signal lines Gn, G(n+1), Dn, D(n+1), D(n+2), C1, and C2 include a plurality of gate lines Gn and G(n+1) which transfer gate signals, which may be referred to herein as scanning signals, a plurality of data lines Dn, D(n+1), and D(n+2) which transfer data voltages, and a plurality of pairs of reference voltage lines C1 and C2 which transfer predetermined reference voltages. The reference voltage lines C1 and C2 include a first reference voltage line C1 and a second reference voltage line C2 which transfer reference voltages having different polarities. A first reference voltage and a second reference voltage, which have a predetermined magnitude, are applied to the first reference voltage line C1 and the second reference voltage line C2. Polarities of the first reference voltage and the second reference voltage may be changed for each frame. For example, in a case in which the magnitude of a common voltage is about 7.5 V, the first reference voltage may have a value of about 15 V or about 0 V for each frame, and the second reference voltage may have a value of about 0 V or about 15 V. The first reference voltage and the second reference voltage may be larger or smaller than a maximum value of the data voltage. Further, in a case in which the first reference voltage and the second reference voltage have positive polarities based on the common voltage, a difference between the first reference voltage and the second reference voltage and the common voltage may be different from a difference between the first reference voltage and the second reference voltage and the common voltage in a case in which the first reference voltage and the second reference voltage have negative polarities based on the common voltage.

The first pixel PX(i, j) includes connections to a first gate line Gn, a first data line Dn, a first reference voltage line C1, and a second reference voltage line C2, and includes a first switching element Qa, a second switching element Qb, a third switching element Qc, a first liquid crystal capacitor C1ca, a second liquid crystal capacitor C1cb, a first storage capacitor Cst1, a second storage capacitor Cst2, a third storage capacitor Cst3, and a fourth storage capacitor Cst4.

The first switching element Qa and the second switching element Qb are connected to the first gate line Gn and the first data line Dn, respectively, and the third switching element Qc is connected to the first gate line Gn, the second reference voltage line C2, and an output terminal of the first switching element Qa.

The first switching element Qa and the second switching element Qb are three-terminal elements such as, for example, a thin film transistor, of which a control terminal is connected to the first gate line Gn and an input terminal is connected to the first data line Dn. Further, the output terminal of the first switching element Qa is connected to the first liquid crystal capacitor C1ca and an output terminal of the third switching element Qc, and the output terminal of the second switching element Qb is connected to the second liquid crystal capacitor C1cb.

The third switching element Qc is a three-terminal element such as, for example, a thin film transistor, of which a control terminal is connected to the first gate line Gn, an input terminal is connected to the second reference voltage line C2, and an output terminal is connected to the first liquid crystal capacitor C1ca.

The first storage capacitor Cst1 is connected to the output terminal of the first switching element Qa and the first reference voltage line C1, the second storage capacitor Cst2 is connected to the output terminal of the first switching element Qa and the second reference voltage line C2, the third storage capacitor Cst3 is connected to the output terminal of the second switching element Qb and the first reference voltage line C1, and the fourth storage capacitor Cst4 is connected to the output terminal of the second switching element Qb and the second reference voltage line C2.

The second pixel PX(i, j+1) includes connections to a first gate line Gn, a second data line D(n+1), a first reference voltage line C1, and a second reference voltage line C2, and includes a first switching element Qa, a second switching element Qb, a third switching element Qc, a first liquid crystal capacitor C1ca, a second liquid crystal capacitor C1cb, a first storage capacitor Cst1, a second storage capacitor Cst2, a third storage capacitor Cst3, and a fourth storage capacitor Cst4.

Control terminals of the first switching element Qa and the second switching element Qb of the second pixel PX(i, j+1) are connected to the first gate line Gn, respectively, and input terminals thereof are connected to the second data line D(n+1), respectively.

An output terminal of the first switching element Qa of the second pixel PX(i, j+1) is connected to the first liquid crystal capacitor C1ca and the output terminal of the third switching element Qc, and an output terminal of the second switching element Qb of the second pixel PX(i, j+1) is connected to the second liquid crystal capacitor C1cb.

A control terminal of the third switching element Qc of the second pixel PX(i, j+1) is connected to the first gate line Gn, an input terminal is connected to the first reference voltage line C1, and an output terminal is connected to the first liquid crystal capacitor C1ca.

The first storage capacitor Cst1 of the second pixel PX(i, j+1) is connected to the output terminal of the first switching element Qa and the second reference voltage line C2, the second storage capacitor Cst2 is connected to the output terminal of the first switching element Qa and the first reference voltage line C1, the third storage capacitor Cst3 is connected to the output terminal of the second switching element Qb and the second reference voltage line C2, and the fourth storage capacitor Cst4 is connected to the output terminal of the second switching element Qb and the first reference voltage line C1.

The third pixel PX(i+1, j) includes connections to a second gate line G(n+1), a second data line D(n+1), a first reference voltage line C1, and a second reference voltage line C2, and includes a first switching element Qa, a second switching element Qb, a third switching element Qc, a first liquid crystal capacitor C1ca, a second liquid crystal capacitor C1cb, a first storage capacitor Cst1, a second storage capacitor Cst2, a third storage capacitor Cst3, and a fourth storage capacitor Cst4.

Control terminals of the first switching element Qa and the second switching element Qb of the third pixel PX(i+1, j) are connected to the second gate line G(n+1), respectively, and input terminals are connected to the second data line D(n+1), respectively.

An output terminal of the first switching element Qa of the third pixel PX(i+1, j) is connected to the first liquid crystal capacitor C1ca and an output terminal of the third switching element Qc, and an output terminal of the second switching element Qb of the third pixel PX(i+1, j) is connected to the second liquid crystal capacitor C1cb.

A control terminal of the third switching element Qc of the third pixel PX(i+1, j) is connected to the second gate line Gn+1, an input terminal is connected to the first reference voltage line C1, and an output terminal is connected to the first liquid crystal capacitor C1ca.

The first storage capacitor Cst1 of the third pixel PX(i+1, j) is connected to the output terminal of the first switching element Qa and the first reference voltage line C1, the second storage capacitor Cst2 is connected to the output terminal of the first switching element Qa and the second reference voltage line C2, the third storage capacitor Cst3 is connected to the output terminal of the second switching element Qb and the first reference voltage line C1, and the fourth storage capacitor Cst4 is connected to the output terminal of the second switching element Qb and the second reference voltage line C2.

The fourth pixel PX(i+1, j+1) includes connections to a second gate line G(n+1), a third data line D(n+2), a first reference voltage line C1, and a second reference voltage line C2, and includes a first switching element Qa, a second switching element Qb, a third switching element Qc, a first liquid crystal capacitor C1ca, a second liquid crystal capacitor C1cb, a first storage capacitor Cst1, a second storage capacitor Cst2, a third storage capacitor Cst3, and a fourth storage capacitor Cst4.

Control terminals of the first switching element Qa and the second switching element Qb of the fourth pixel PX(i+1, j+1) are connected to the second gate line G(n+1), respectively, and input terminals are connected to the third data line D(n+2), respectively.

An output terminal of the first switching element Qa of the fourth pixel PX(i+1, j+1) is connected to the first liquid crystal capacitor C1ca and an output terminal of the third switching element Qc, and an output terminal of the second switching element Qb of the fourth pixel PX(i+1, j+1) is connected to the second liquid crystal capacitor C1cb. A control terminal of the third switching element Qc of the fourth pixel PX(i+1, j+1) is connected to the second gate line G(n+1), an input terminal is connected to the second reference voltage line C2, and an output terminal is connected to the first liquid crystal capacitor C1ca.

The first storage capacitor Cst1 of the fourth pixel PX(i+1, j+1) is connected to the output terminal of the first switching element Qa and the second reference voltage line C2, the second storage capacitor Cst2 is connected to the output terminal of the first switching element Qa and the first reference voltage line C1, the third storage capacitor Cst3 is connected to the output terminal of the second switching element Qb and the second reference voltage line C2, and the fourth storage capacitor Cst4 is connected to the output terminal of the second switching element Qb and the first reference voltage line C1.

When a gate-on signal is applied to the first gate line Gn, the first switching elements Qa, the second switching elements Qb, and the third switching elements Qc of the first pixel PX(i, j) and the second pixel PX(i, j+1), which are connected to the first gate line Gn, are turned on. Accordingly, the data voltage applied to the first data line Dn is connected to one terminal of the first liquid crystal capacitor C1ca and the second liquid crystal capacitor C1cb of the first pixel PX(i, j) through the turned-on first switching element Qa and second switching element Qb of the first pixel PX(i, j), and the data voltage applied to the second data line D(n+1) is connected to one terminal of the first liquid crystal capacitor C1ca and the second liquid crystal capacitor C1cb of the second pixel PX(i, j+1) through the turned-on first switching element Qa and second switching element Qb of the second pixel PX(i, j+1). In this case, the first liquid crystal capacitor C1ca and the second liquid crystal capacitor C1cb of the first pixel PX(i, j) are charged to about the same voltage, and the first liquid crystal capacitor C1ca and the second liquid crystal capacitor C1cb of the second pixel PX(i, j+1) are charged to about the same voltage. Simultaneously, one terminal of the first liquid crystal capacitor C1ca of the first pixel PX(i, j) is connected to the output terminal of the third switching element Qc to be boosted by the reference voltage which is applied to the second reference voltage line C2 through the third switching element Qc. In this case, the second reference voltage applied to the second reference voltage line C2 has the same polarity as the data voltage applied to the first data line Dn, and a magnitude thereof may be larger than that of the data voltage applied to the first data line Dn. Accordingly, the voltage of the second reference voltage line C2 to which a relatively high voltage is applied through the third switching element Qc is divided, and thus, the voltage which is charged to the first liquid crystal capacitor C1ca has a higher value than the data voltage applied through the first data line Dn.

Further, one terminal of the first liquid crystal capacitor C1ca of the second pixel PX(i, j+1) is connected to the output terminal of the third switching element Qc to be boosted by the reference voltage which is applied to the first reference voltage line C1 through the third switching element Qc. In this case, the first reference voltage applied to the first reference voltage line C1 has the same polarity as the data voltage applied to the second data line D(n+1) and may have a higher value than the data voltage applied to the second data line D(n+1). Accordingly, the voltage of the first reference voltage line C1, to which a relatively high voltage is applied through the third switching element Qc, is divided, and thus, the voltage which is charged to the first liquid crystal capacitor C1ca has a higher value than the data voltage.

When the gate voltage of the first gate line Gn is changed into the gate-off voltage, and the gate voltage of the second gate line G(n+1) is changed into the gate-on voltage, the first switching elements Qa, the second switching elements Qb, and the third switching elements Qc of the third pixel PX (i+1, j) and the fourth pixel PX(i+1, j+1), which are connected to the second gate line G(n+1), are turned on. Accordingly, the data voltage applied to the second data line D(n+1) is applied to one terminal of each of the first liquid crystal capacitor C1ca and the second liquid crystal capacitor C1cb of the third pixel PX (i+1, j) through the turned-on first switching element Qa and second switching element Qb of the third pixel PX (i+1, j), and the data voltage applied to the third data line D(n+2) is applied to one terminal of each of the first liquid crystal capacitor C1ca and the second liquid crystal capacitor C1cb of the fourth pixel PX(i+1, j+1) through the turned-on first switching element Qa and second switching element Qb of the fourth pixel PX(i+1, j+1). In this case, the first liquid crystal capacitor C1ca and the second liquid crystal capacitor C1cb of the third pixel PX(i+1, j) are charged to about the same voltage, and the first liquid crystal capacitor C1ca and the second liquid crystal capacitor C1cb of the fourth pixel PX(i+1, j+1) are charged to about the same voltage. Simultaneously, one terminal of the first liquid crystal capacitor C1ca of the third pixel PX (i+1, j) is connected to the output terminal of the third switching element Qc to be boosted by the reference voltage which is applied to the first reference voltage line C1 through the third switching element Qc. In this case, the first reference voltage applied to the first reference voltage line C1 has the same polarity as the data voltage applied to the second data line D(n+1) and may have a higher value than the data voltage applied to the second data line D(n+1). Accordingly, the voltage of the first reference voltage line C1 to which a relatively high voltage is applied through the third switching element Qc is divided, and thus, a magnitude of the voltage which is charged to the first liquid crystal capacitor C1ca has a higher value than the data voltage which is applied through the second data line Dn+1.

Further, one terminal of the first liquid crystal capacitor C1ca of the fourth pixel PX(i+1, j+1) is connected to the output terminal of the third switching element Qc to be boosted by the reference voltage which is applied to the second reference voltage line C2 through the third switching element Qc. In this case, the second reference voltage applied to the second reference voltage line C2 has the same polarity as the data voltage applied to the third data line Dn+2 and may have a higher value than the data voltage applied to the third data line Dn+2. Accordingly, the voltage of the second reference voltage line C2, to which a relatively high voltage is applied through the third switching element Qc, is divided, and thus, the magnitude of the voltage which is charged to the first liquid crystal capacitor C1ca is larger than that of the data voltage.

The voltage charged in the first liquid crystal capacitor C1ca and the voltage charged in the second liquid crystal capacitor C1cb are different from each other. Since the voltage charged in the first liquid crystal capacitor C1ca and the voltage charged in the second liquid crystal capacitor C1cb are different from each other, inclined angles of liquid crystal molecules are different from each other in the first subpixel and the second subpixel, and thus, luminances of the two subpixels are different from each other. Accordingly, by properly controlling the voltage charged in the first liquid crystal capacitor C1ca and the voltage charged in the second liquid crystal capacitor C1cb, an image viewed from the side may be closer to an image viewed from the front, thereby improving side visibility.

An example of the liquid crystal display according to the exemplary embodiment shown in FIG. 1 will be described herein with reference to FIGS. 2 to 4.

Figure 2:
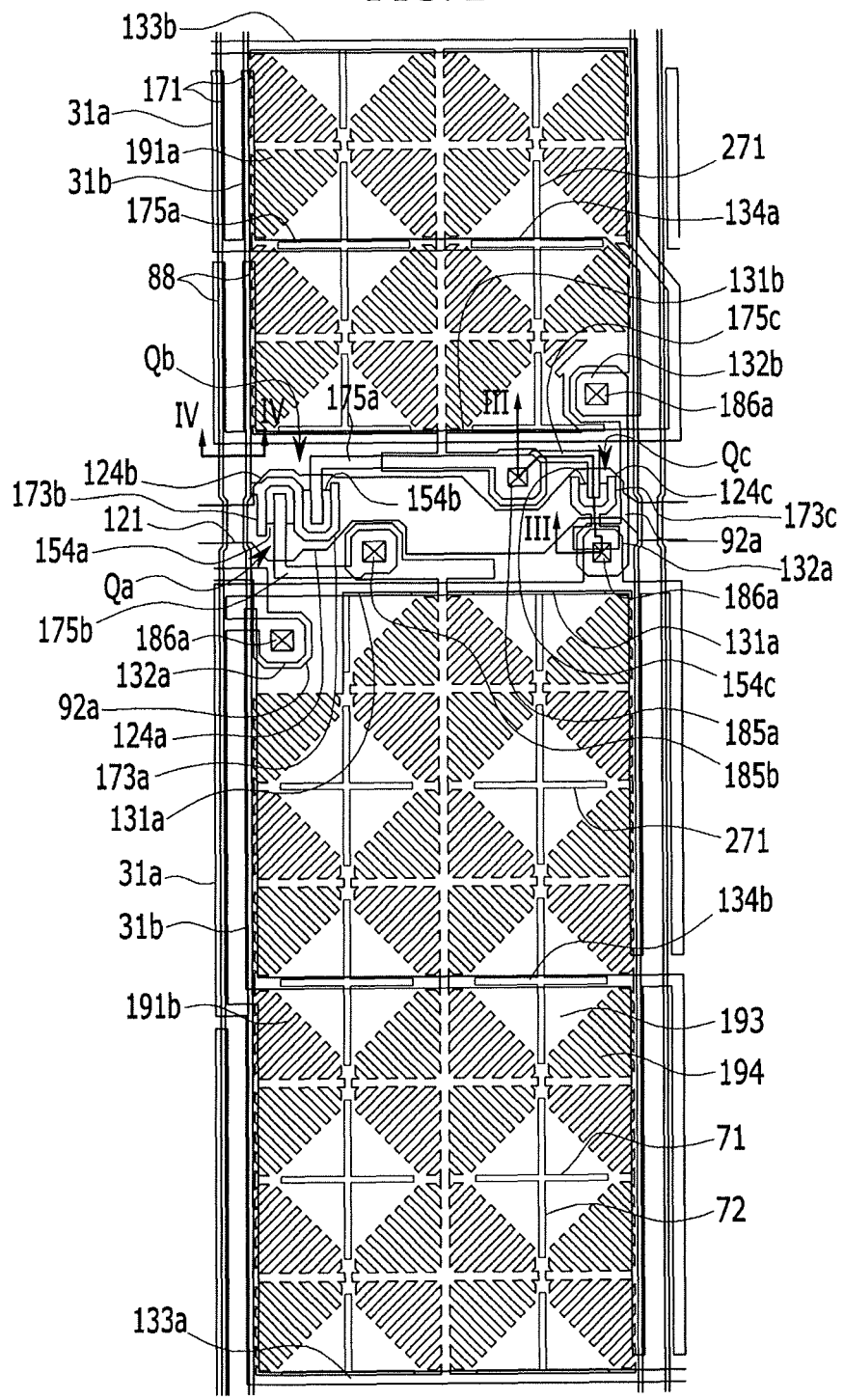
FIG. 2 is a layout view of a liquid crystal display according to an exemplary embodiment of the present invention.

FIG. 2 is a layout view of the liquid crystal display according to an exemplary embodiment of the present invention. FIG. 3 is a cross-sectional view of the liquid crystal display of FIG. 2 taken along line III-III. FIG. 4 is a cross-sectional view of the liquid crystal display of FIG. 2 taken along line IV-IV.

Figure 3:
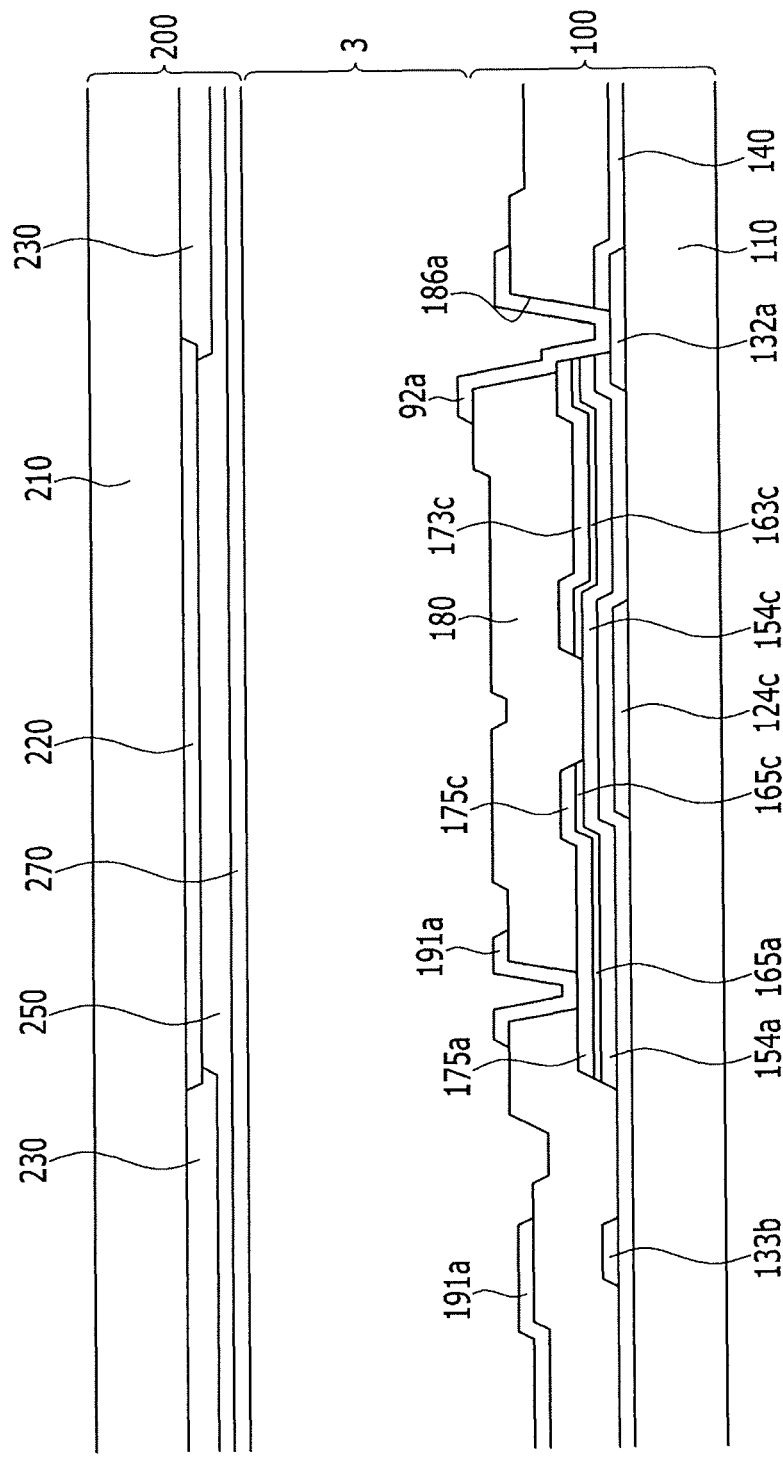
FIG. 3 is a cross-sectional view of the liquid crystal display of FIG. 2 taken along line III-III.
Figure 4:
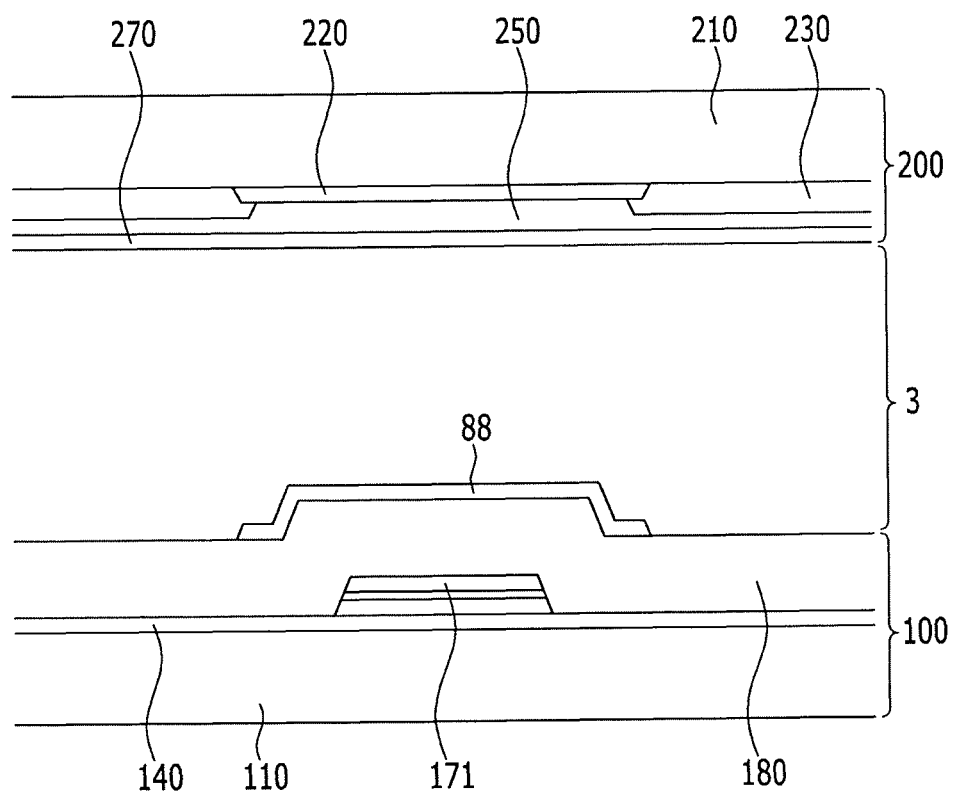
FIG. 4 is a cross-sectional view of the liquid crystal display of FIG. 2 taken along line IV-IV.

Referring to FIGS. 2 to 4, the liquid crystal display according to an exemplary embodiment of the present invention includes a lower panel 100 and an upper panel 200, which face each other, and a liquid crystal layer 3 injected between the two panels 100 and 200.

The lower panel 100 will now be described herein.

A gate conductor including a plurality of gate lines 121 and a plurality of reference voltage lines 131a and 131b is disposed on a first insulation substrate 110.

The gate line 121 transmits a gate signal, and includes a first gate electrode 124a, a second gate electrode 124b and a third gate electrode 124c.

The reference voltage lines 131a and 131b include a first reference voltage line 131a that transmits a first reference voltage and a second reference voltage line 131b that transmits a second reference voltage. The first reference voltage line 131a and the second reference voltage line 131b are disposed at both sides of a data line 171, and include longitudinal portions 31a and 31b extending with the data line 171. The longitudinal portions 31a and 31b are connected to each other by a transverse portion, which is described in further detail below.

The first reference voltage line 131a and the second reference voltage line 131b include a first transverse portion 133a and a second transverse portion 133b, and a third transverse portion 134a and a fourth transverse portion 134b extending substantially parallel to the gate line 121 along with an edge and a center of a first subpixel electrode 191a and a second subpixel electrode 191b.

The first reference voltage line 131a has a first extension 132a, and the second reference voltage line 131b has a second extension 132b.

A gate insulating layer 140 is disposed on the gate line 121 and the reference voltage lines 131a and 131b.

A first semiconductor 154a, a second semiconductor 154b, and a third semiconductor 154c are disposed on the gate insulating layer 140.

Ohmic contacts 165a, 163c, and 165c are disposed on the first semiconductor 154a, the second semiconductor 154b, and the third semiconductor 154c. The semiconductors 154a, 154b, and 154c may include, for example, an oxide semiconductor. In this case, the ohmic contacts may be omitted.

A data conductor including the data line 171 including a first source electrode 173a, a second source electrode 173b, a third source electrode 173c, a first drain electrode 175a, a second drain electrode 175b, and a third drain electrode 175c is formed on the ohmic contacts 165a, 163c, and 165c and the gate insulating layer 140. The first drain electrode 175a and the third drain electrode 175c are connected to each other.

A passivation layer 180 is formed on the data conductors 171, 173a, 173b, 173c, 175a, 175b, and 175c. The passivation layer 180 may be made of, for example, an inorganic insulator or an organic insulator.

A first contact hole 185a which exposes a part of the first drain electrode 175a, and a second contact hole 185b which exposes a part of the second drain electrode 175b, are formed in the passivation layer 180. A third contact hole 186a which exposes the first extension 132a of the first reference voltage line 131a, and a fourth contact hole which exposes the second extension of the second reference voltage line 131b, are formed in the gate insulating layer 140 and the passivation layer 180.

The first subpixel electrode 191a and the second subpixel electrode 191b, a first connecting member 92a and a second connecting member, and a shielding electrode 88 are formed on the passivation layer 180.

The first subpixel electrode 191a is physically and electrically connected with the first drain electrode 175a through the first contact hole 185a, and the second subpixel electrode 191b is physically and electrically connected with the second drain electrode 175b through the second contact hole 185b.

The first subpixel electrode 191a and the second subpixel electrode 191b are separated from each other with the gate line 121 disposed therebetween, and are disposed at the upper and lower sides of the pixel area based on the gate line 121 such that they are adjacent to each other in a column direction. The first subpixel electrode 191a and the second subpixel electrode 191b include a plate shape portion 193 having, for example, a rhombus shape, and a plurality of branch electrodes 194 extending in four directions from the plate shape portion 193. The shape of the plate shape portion 193, and the number and directions of the branch electrodes 194 described herein, are not limited thereto. The plurality of branch electrodes 194 include a portion obliquely extending in a right-upper direction, a portion obliquely extending in a right-lower direction, a portion obliquely extending in a left-upper direction, and a portion obliquely extending in a left-lower direction. As described above, inclined directions of the liquid crystal molecules in each portion in which the plurality of branch electrodes 194 extend in the different directions are different from each other. Accordingly, four domains in which the inclination directions of the liquid crystal molecules are different are formed in the liquid crystal layer 3. As described above, when the inclined directions of the liquid crystal molecules are varied, a reference viewing angle of the liquid crystal display may increase.

The first subpixel electrode 191a and the second subpixel electrode 191b are divided into a plurality of sub-regions by the plate shape portion 193 having the rhombus shape and the plurality of branch electrodes 194 extending from the plate shape portion 193 in four directions.

An area of the second subpixel electrode 191b may be larger than an area of the first subpixel electrode 191a.

The first connecting member 92a connects the first extensions 132a of the first reference voltage line 131a, which are disposed at the upper and lower sides in a pixel column direction with the gate line 121 disposed therebetween. The second connecting member connects the second extensions of the second reference voltage lines 131b, which are disposed at the adjacent pixel areas.

The shielding electrode 88 overlaps the data line 171 and extends substantially parallel to the data line 171. The shielding electrode 88 is applied with a voltage having substantially the same magnitude as the common voltage. Therefore, a voltage difference is not generated between the shielding electrode 88 and the common electrode 270, and the liquid crystal molecules positioned at the position overlapping the shielding electrode 88 therefore maintain the initial state. Accordingly, the influence of the voltage applied to the data line 171 and the longitudinal portions 31a and 31b of the first reference voltage line 131a and the second reference voltage line 131b may be decreased such that an irregular movement of the liquid crystal molecules that may be generated near the data line 171 may be reduced or prevented, thereby reducing or preventing display quality deterioration such as, for example, light leakage.

The first transverse portion 133a, the second transverse portion 133b, the third transverse portion 134a, and the fourth transverse portion 134b of the first reference voltage line 131a and the second reference voltage line 131b extend substantially parallel to the gate line 121 along with the edge and the center of the first subpixel electrode 191a and the second subpixel electrode 191b, and overlap the plate shape portion 193 of the first subpixel electrode 191a and the second subpixel electrode 191b. Accordingly, while increasing storage capacitance of the storage capacitor, the first reference voltage and the second reference voltage applied as the voltages having different polarities to the first reference voltage line 131a and the second reference voltage line 131b may be prevented from influencing the common voltage of the common electrode 270 such that the change of the common voltage by the storage voltage of a different magnitude may be prevented, thereby reducing or preventing light leakage generated by the change of the common voltage.

The first gate electrode 124a, the first semiconductor 154a, the first source electrode 173a, and the first drain electrode 175a form a first switching element Qa, the second gate electrode 124b, the second semiconductor 154b, the second source electrode 173b, and the second drain electrode 175b form a second switching element Qb, and the third gate electrode 124c, the third semiconductor 154c, the third source electrode 173c, and the third drain electrode 175c form a third switching element Qc.

The upper panel 200 will now be described herein.

A light blocking member 220 is positioned on a second insulation substrate 210. The light blocking member 220 may be referred to as a black matrix and blocks light leakage. A plurality of color filters 230 are disposed on the second insulation substrate 210 and light blocking member 220. An overcoat layer 250 is disposed on the color filters 230. The overcoat layer 250 may prevent the color filters 230 and the light blocking member 220 from being detached, and may suppress contamination of the liquid crystal layer 3 due to an organic material such as a solvent which is input from the color filter 230 to thereby prevent a defect such as, for example, ghosting, which may be caused during screen driving. In exemplary embodiments, the overcoat layer 250 may be omitted. The common electrode 270 is disposed on the overcoat layer 250.

In the liquid crystal display shown in the exemplary embodiment of FIGS. 1 to 4, the light blocking member 220 and the color filters 230 are disposed on the upper panel 200, however, exemplary embodiments are not limited thereto. For example, the light blocking member 220 and the color filters 230 may be disposed on the lower panel 100. In this case, the color filters 230 may be disposed in place of the passivation layer 180 of the lower panel 100.

The common electrode 270 has a cross-shaped cutout 271 formed at the position corresponding to each sub-region of the first subpixel electrode 191a and the second subpixel electrode 191b, which includes a transverse cutout 71 substantially parallel to the gate line 121 and a longitudinal stem 72 substantially parallel to the data line.

Referring to the layout view of FIG. 2, each sub-region of the first subpixel electrode 191a and the second subpixel electrode 191b is divided into four regions by the cross-shaped cutout 271 of the common electrode 270 and a plurality of branch electrode 194 of the subpixel electrodes 191a and 191b.

As described above, the third transverse portion 134a and the fourth transverse portion 134b of the first reference voltage line 131a and the second reference voltage line 131b are formed at a position overlapping the transverse cutout 71 of the cross-shaped cutout 271 of the common electrode 270. Accordingly, while increasing storage capacitance of the storage capacitor, the first reference voltage and the second reference voltage applied as the voltages having different polarities to the first reference voltage line 131a and the second reference voltage line 131b may be prevented from influencing the common voltage of the common electrode 270 such that the change of the common voltage by the storage voltage of a different magnitude may be prevented, thereby reducing or preventing light leakage generated by the change of the common voltage and aperture ratio deterioration by the first transverse portion 133a, the second transverse portion 133b, the third transverse portion 134a, and the fourth transverse portion 134b of the first reference voltage line 131a and the second reference voltage line 131b.

The first subpixel electrode 191a and the common electrode 270 form the first liquid crystal capacitor C1ca together with the liquid crystal layer 3 disposed therebetween. The second subpixel electrode 191b and the common electrode 270 form the second liquid crystal capacitor C1cb together with the liquid crystal layer 3 disposed therebetween.

The first subpixel electrode 191a overlaps the first reference voltage line 131a and the second reference voltage line 131b, which are disposed at the left and right sides, to form the first storage capacitor Cst1 and the second storage capacitor Cst2, and reinforce a voltage storage capacity of the first liquid crystal capacitor C1ca. The second subpixel electrode 191b overlaps the first reference voltage line 131a and the second reference voltage line 131b, which are disposed at the left and right sides, to form the third storage capacitor Cst3 and the fourth storage capacitor Cst4, and reinforce a voltage storage capacity of the second liquid crystal capacitor C1cb.

An electric field is applied to the liquid crystal layer 3 by the voltages applied to the first subpixel electrode 191a and the second subpixel electrode 191b, and the common voltage applied to the common electrode 270. Directions of the liquid crystal molecules of the liquid crystal layer 3 are determined according to the intensity of the electric field. As described above, luminance of light which passes through the liquid crystal layer 3 varies according to the directions of the liquid crystal molecules.

As described above, the first subpixel electrode 191a overlaps the first reference voltage line 131a and the second reference voltage line 131b, which are disposed at the left and right sides, to form the first storage capacitor Cst1 and the second storage capacitor Cst2, and reinforce a voltage storage capacity of the first liquid crystal capacitor C1ca. The second subpixel electrode 191b overlaps the first reference voltage line 131a and the second reference voltage line 131b, which are disposed at the left and right sides, to form the third storage capacitor Cst3 and the fourth storage capacitor Cst4, and reinforce a voltage storage capacity of the second liquid crystal capacitor C1cb.

Further, the first reference voltage and second reference voltage, which have a predetermined magnitude, are applied to the first reference voltage line 131a and the second reference voltage line 131b, and polarities of the first reference voltage and the second reference voltage are changed for each frame. For example, in a case in which the magnitude of the common voltage is about 7.5 V, the first reference voltage may have a value of about 15 V or about 0 V for each frame, and the second reference voltage may have a value of about 0 V or about 15 V. The first reference voltage and the second reference voltage may be larger or smaller than a maximum value which is applied to the data voltage. Further, in a case in which the first reference voltage and the second reference voltage have positive polarities based on the common voltage, a difference between the first reference voltage and the second reference voltage and the common voltage may be different from a difference between the first reference voltage and the second reference voltage and the common voltage in a case in which the first reference voltage and the second reference voltage have negative polarities based on the common voltage.

However, since the subpixel electrodes 191a and 191b overlap the first reference voltage line 131a and the second reference voltage line 131b to which the first reference voltage and the second reference voltage having different polarities are applied to form the storage capacitor, although the polarities of the first reference voltage and the second reference voltage are changed for each frame, the pixel voltage is not changed. This will be described with reference to FIG. 5.

Figure 5:
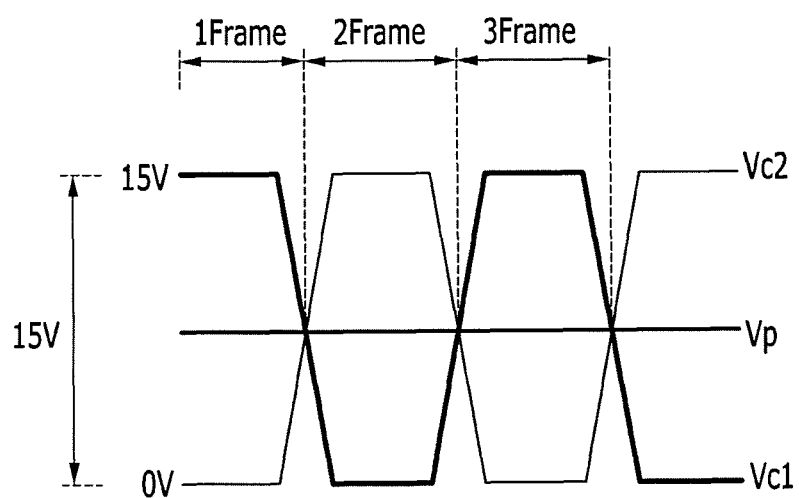
FIG. 5 is a waveform diagram showing a voltage change of a pixel area depending on a voltage applied for each frame.

FIG. 5 is a waveform diagram showing a voltage change of a pixel area depending on a voltage applied for each frame.

Referring to FIG. 5, a first reference voltage Vc1 applied to the first reference voltage line 131a has a value of about 15 V for a first frame, a value of about 0 V for a second frame, and a value of about 15 V for a third frame. A second reference voltage Vc2 applied to the second reference voltage line 131b has a value of about 0 V for a first frame, a value of about 15 V for a second frame, and a value of about 0 V for a third frame.

As described above, although polarities of the first reference voltage Vc1 and the second reference voltage Vc2 are different from each other and are changed for each frame, since the subpixel electrodes 191a and 191b overlap the first reference voltage line 131a and the second reference voltage line 131b, changes in storage capacitance of the storage capacitors according to the polarity change of the first reference voltage Vc1 and the second reference voltage Vc2 are offset. As a result, a magnitude of a voltage Vp, which is charged in each of the subpixel electrodes 191a and 191b, is not influenced to be uniformly maintained.

A transmittance change depending on a pixel voltage of a liquid crystal display in an example according to an exemplary embodiment of the present invention will be described with reference to FIGS. 6 and 7.

Figure 6:
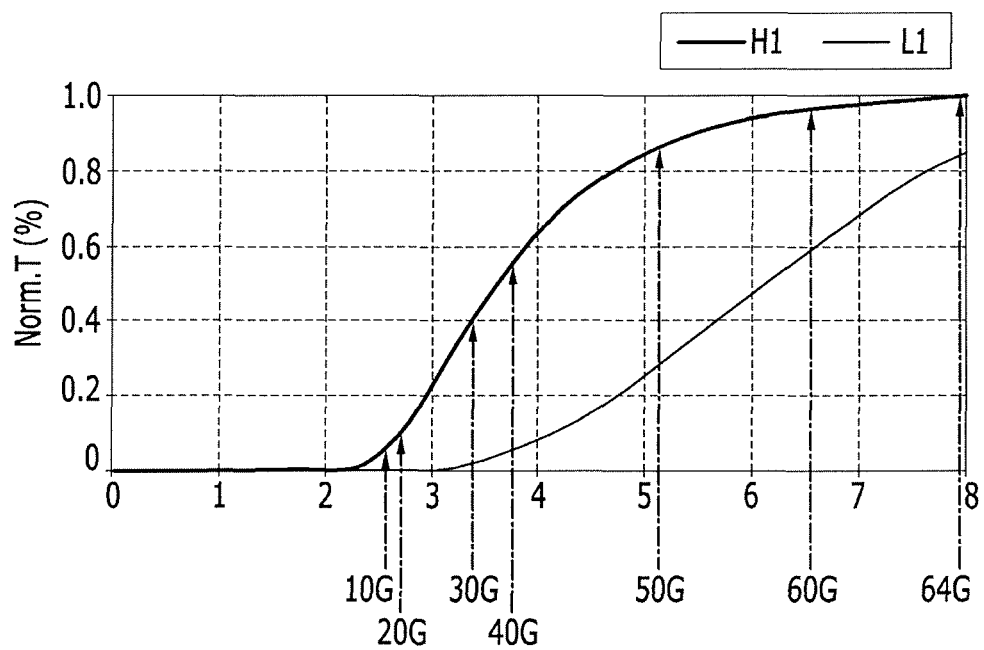
FIGS. 6 and 7 are graphs showing a transmittance change depending on a pixel voltage of a liquid crystal display in an example according to an exemplary embodiment of the present invention.
Figure 7:
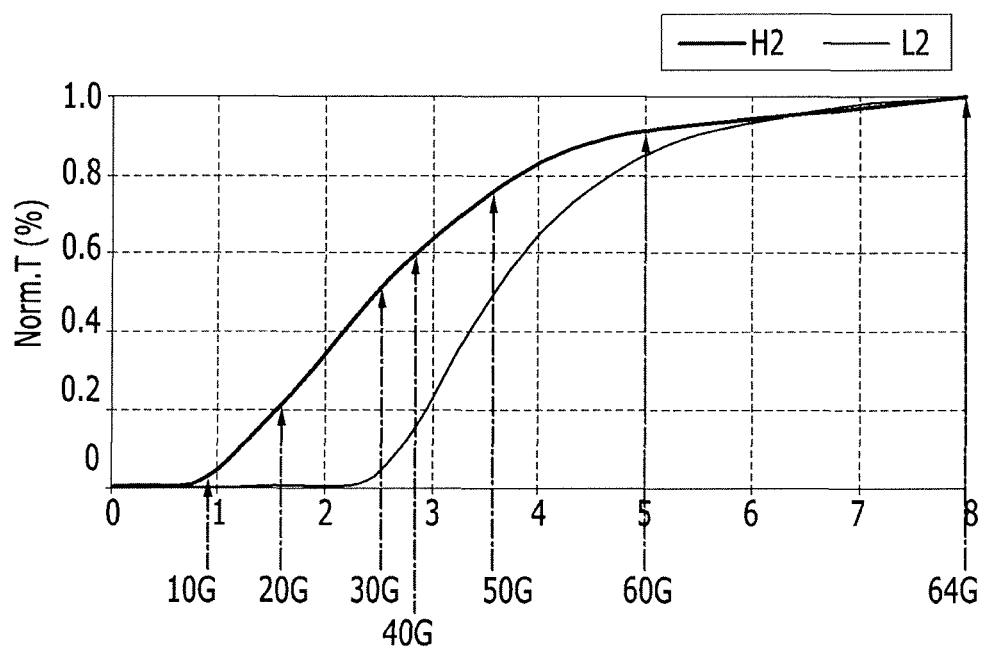

FIGS. 6 and 7 are graphs showing a transmittance change depending on a pixel voltage of a liquid crystal display in an example according to an exemplary embodiment of the present invention.

In the example referred to in FIGS. 6 and 7, in a liquid crystal display, a pixel electrode is divided into a first subpixel electrode and a second subpixel electrode, and a voltage applied to the second subpixel electrode is divided to control the voltage applied to the second subpixel electrode to be lower than an inputted data voltage. A transmittance change H1 depending on the data voltage applied to the first subpixel electrode and a transmittance change L1 depending on the data voltage applied to the second subpixel electrode are as shown in FIG. 6. Further, in a case in which a pixel electrode in a liquid crystal display is divided into a first subpixel electrode and a second subpixel electrode to control the voltage applied to the first subpixel electrode to be higher than the inputted data voltage, a transmittance change H2 depending on the data voltage applied to the first subpixel electrode and a transmittance change L2 depending on the data voltage applied to the second subpixel electrode are shown in FIG. 7.

Referring to FIG. 6, the voltage of the second subpixel electrode of the first subpixel electrode and the second subpixel electrode to which the same data voltage is applied through the data line is lowered by a predetermined value. Accordingly, in a case in which a value of inputted data voltage is relatively low, for example, a data voltage of about 4 V or less, the entire transmittance depends on only the transmittance H1 of the first subpixel electrode. Therefore, the transmittance remains mostly unchanged until a low gray region, for example, at about a 20 gray 20G, and as a result, the gray expression may be difficult. Further, from about the 20 gray 20G to about a 40 gray 40G, a rate of increase in the transmittance depending on the applied data voltage is increased, and thus, the transmittance is rapidly increased. As a result, a phenomenon in which a screen is shown as white may occur. It may be difficult to express the gray depending on the data voltage in the low gray region. Further, in the case of a high gray region, and for example, where the data voltage is about 6.7 V or more, the transmittance depending on the voltage of the second subpixel electrode is decreased, and thus, the entire transmittance of the liquid crystal display is lower than the inputted data voltage. Accordingly, the transmittance efficiency of the liquid crystal display may be lowered compared to the driving voltage.

Referring to FIG. 7, the voltage of the first subpixel electrode of the first subpixel electrode and the second subpixel electrode to which the same voltage is applied through the data line is increased by a predetermined value. Accordingly, the change in the transmittance depending on the applied data voltage is clear even in the low gray region, and thus, the gray expression is possible even in the low gray. Further, the rate of increase in the transmittance depending on the applied data voltage is almost constant even in the low gray region, and thus, the transmittance is rapidly increased in a predetermined gray. As a result, a phenomenon in which a screen is shown as white may be prevented. Further, in the case of a high gray region, and for example, where the data voltage is about 6.7 V or more, the transmittance is not greatly decreased, and thus, the entire transmittance of the liquid crystal display is increased. Accordingly, the driving efficiency of the liquid crystal display is increased.

A transmittance change depending on a gray of a liquid crystal display in an example according to an exemplary embodiment of the present invention will be described with reference to FIG. 8.

Figure 8:
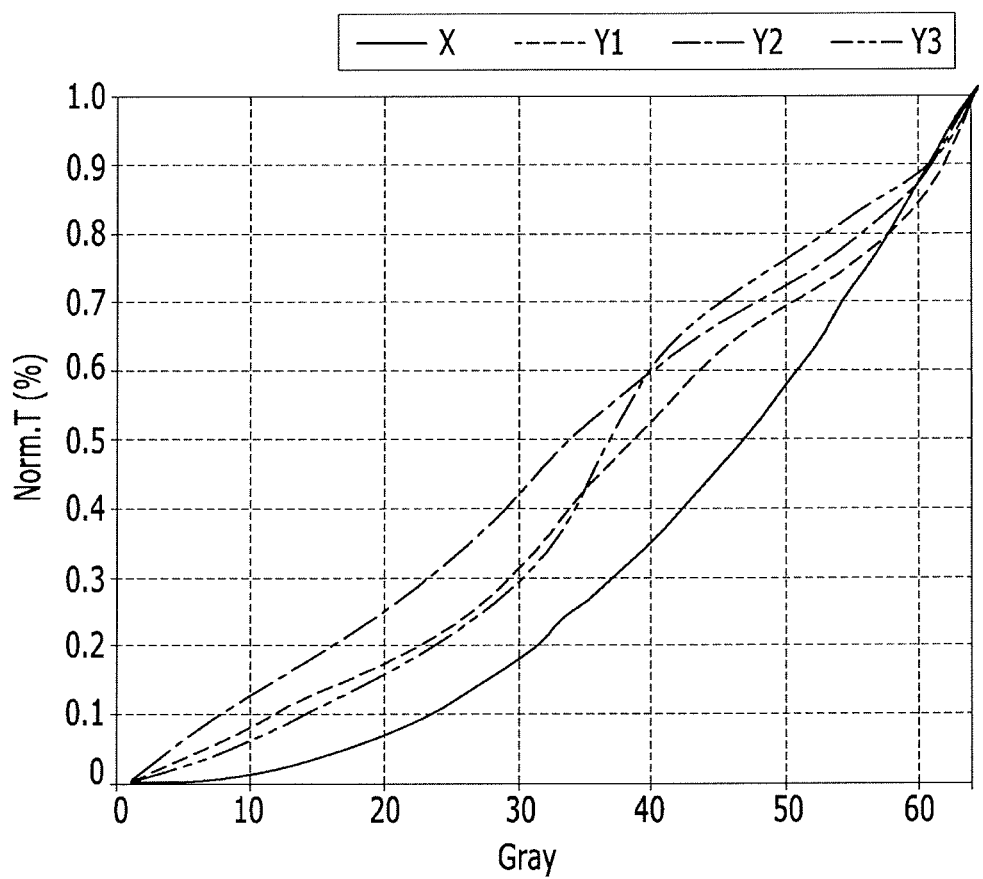
FIG. 8 is a graph showing a transmittance change depending on a gray of a liquid crystal display in an example according to an exemplary embodiment of the present invention.

FIG. 8 is a graph showing a transmittance change depending on a gray of the liquid crystal display in an example according to an exemplary embodiment of the present invention.

In the example referred to in FIG. 8, a transmittance change X for each gray in the front and a transmittance change Y1 for each gray in a case in which the pixel electrode is divided into the first subpixel electrode and the second subpixel electrode are measured. Different data voltages are applied to the first subpixel electrode and the second subpixel electrode. A transmittance change Y2 for each gray in the side in a case in which the pixel electrode is divided into the first subpixel electrode and the second subpixel electrode is measured. The voltage applied to the second subpixel electrode is divided to control the voltage applied to the second subpixel electrode to be lower than the inputted data voltage. A transmittance change Y3 for each gray in a case in which the pixel electrode is divided into the first subpixel electrode and the second subpixel electrode to control the voltage applied to the first subpixel electrode to be higher than the inputted data voltage is measured. The measured transmittance changes are shown in FIG. 8.

Referring to FIG. 8, as compared with the cases Y1 and Y2, in the case Y3, side transmittance is closest to front transmittance in the low gray region, for example, at about 30 gray 30G or less, and the transmittance change depending on the gray is gradual. Thus, according to exemplary embodiments of the present invention, the gray may be accurately expressed in the low gray region, high luminance may be obtained, and side visibility may be made close to the front visibility to improve the viewing angle of the display.

According to exemplary embodiments of the present invention, a pixel electrode is divided into a first subpixel electrode and a second subpixel electrode, the same data voltage is applied to the first subpixel electrode and the second subpixel electrode, which include a thin film transistor connected to the first subpixel electrode and the reference voltage line, such that the voltage of the first subpixel electrode may be controlled to be higher than the data voltage. Therefore, a gray change in a low gray region may be smoothly controlled, and as a result, the gray may be accurately expressed in the low gray region, high luminance may be obtained, and side visibility may be made close to front visibility, thereby improving the viewing angle of the display.

A liquid crystal display according to an exemplary embodiment of the present invention will be described with reference to FIGS. 9 to 11.

Figure 9:
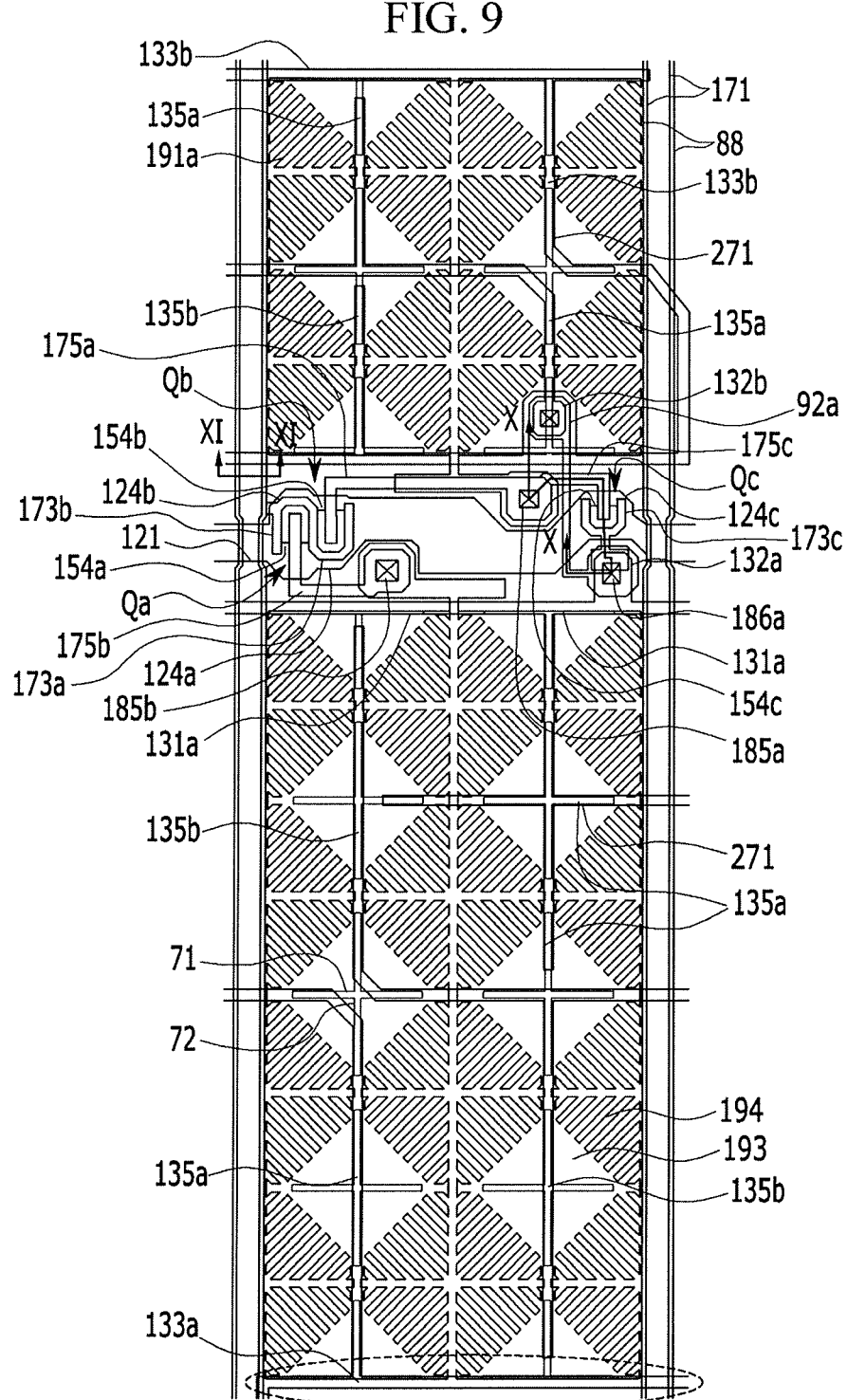
FIG. 9 is a layout view of a liquid crystal display according to an exemplary embodiment of the present invention.

FIG. 9 is a layout view of the liquid crystal display according to an exemplary embodiment of the present invention. FIG. 10 is a cross-sectional view of the liquid crystal display of FIG. 9 taken along line X-X. FIG. 11 is a cross-sectional view of the liquid crystal display of FIG. 9 taken along line XI-XI.

Figure 10:
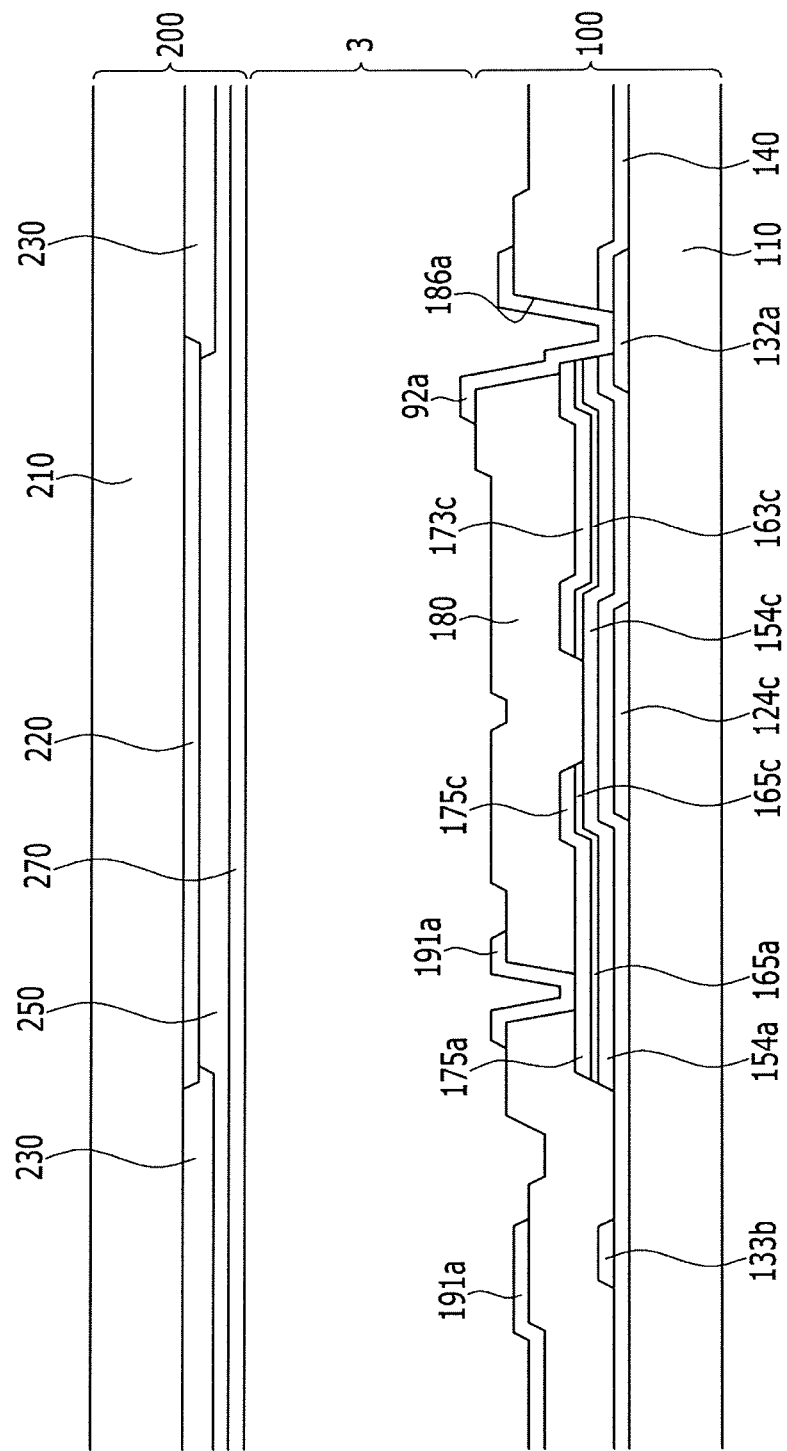
FIG. 10 is a cross-sectional view of the liquid crystal display of FIG. 9 taken along line X-X.
Figure 11:
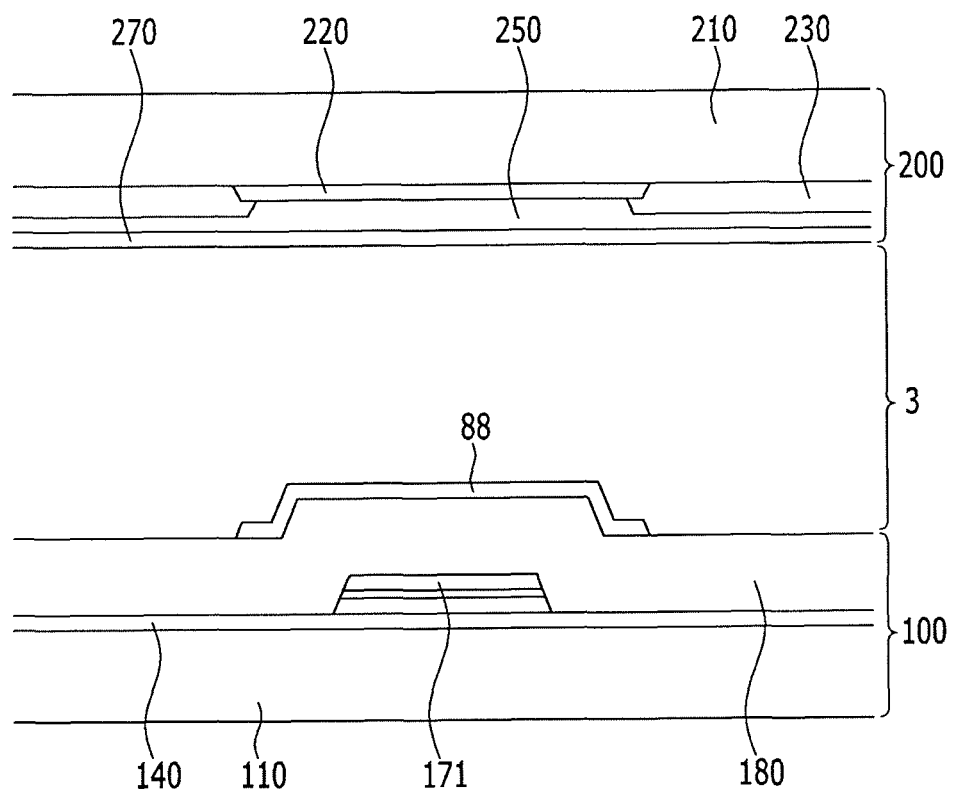
FIG. 11 is a cross-sectional view of the liquid crystal display of FIG. 9 taken along line XI-XI.

Referring to FIGS. 9 to 11, certain elements of the liquid crystal display are similar to certain elements of the liquid crystal display described with reference to FIGS. 1 to 3. For convenience of explanation, a description of elements previously described may be omitted.

Referring to FIGS. 9 to 11, the liquid crystal display includes a lower panel 100 and an upper panel 200 which face each other, and a liquid crystal layer 3 injected between the two panels 100 and 200.

The lower panel 100 will now be described herein.

A gate conductor including a plurality of gate lines 121 and a plurality of reference voltage lines 131a and 131b is disposed on a first insulation substrate 110.

The gate line 121 transmits a gate signal, and includes a first gate electrode 124a, a second gate electrode 124b, and a third gate electrode 124c.

The reference voltage lines 131a and 131b include a first reference voltage line 131a that transmits a first reference voltage and a second reference voltage line 131b that transmits a second reference voltage.

The first reference voltage line 131a and the second reference voltage line 131b include a first transverse portion 133a and a second transverse portion 133b that overlap the edge of the first subpixel electrode 191a and the second subpixel electrode 191b and extend substantially parallel to the gate line 121. The first reference voltage line 131a and the second reference voltage line 131b further include a third transverse portion 134a and a fourth transverse portion 134b that overlap the first subpixel electrode 191a and the second subpixel electrode 191b in the center portion of the pixel area and extend substantially parallel to the gate line 121, and a first longitudinal portion 135a and a second longitudinal portion 135b that overlap the first subpixel electrode 191a and the second subpixel electrode 191b in the center portion of the pixel area and extend substantially parallel to the data line 171.

The first reference voltage line 131a has a first extension 132a, and the second reference voltage line 131b has a second extension 132b.

A gate insulating layer 140 is disposed on the gate line 121 and the reference voltage lines 131a and 131b.

A first semiconductor 154a, a second semiconductor 154b, and a third semiconductor 154c are disposed on the gate insulating layer 140.

Ohmic contacts 165a, 163c, and 165c are disposed on the first semiconductor 154a, the second semiconductor 154b, and the third semiconductor 154c.

A data conductor including the data line 171 including a first source electrode 173a, a second source electrode 173b, a third source electrode 173c, a first drain electrode 175a, a second drain electrode 175b, and a third drain electrode 175c is formed on the ohmic contacts 165a, 163c, and 165c and the gate insulating layer 140. The first drain electrode 175a and the third drain electrode 175c are connected to each other.

A passivation layer 180 is formed on the data conductors 171, 173a, 173b, 173c, 175a, 175b, and 175c.

A first contact hole 185a which exposes a part of the first drain electrode 175a, and a second contact hole 185b which exposes a part of the second drain electrode 175b, are formed in the passivation layer 180. A third contact hole 186a which exposes the first extension 132a of the first reference voltage line 131a, and a fourth contact hole which exposes the second extension of the second reference voltage line 131b, are formed in the gate insulating layer 140 and the passivation layer 180.

The first subpixel electrode 191a and the second subpixel electrode 191b, a first connecting member 92a and a second connecting member, and a shielding electrode 88 are formed on the passivation layer 180.

The first subpixel electrode 191a is physically and electrically connected with the first drain electrode 175a through the first contact hole 185a, and the second subpixel electrode 191b is physically and electrically connected with the second drain electrode 175b through the second contact hole 185b.

The first subpixel electrode 191a and the second subpixel electrode 191b are separated from each other with the gate line 121 disposed therebetween, and are disposed at the upper and lower sides of the pixel area based on the gate line 121 such that they are adjacent to each other in a column direction. The first subpixel electrode 191a and the second subpixel electrode 191b include a plate shape portion 193 having, for example, a rhombus shape, and a plurality of branch electrodes 194 extending in four directions from the plate shape portion 193. The shape of the plate shape portion 193, and the number and directions of the branch electrodes 194 described herein, are not limited thereto. The plurality of branch electrodes 194 include a portion obliquely extending in a right-upper direction, a portion obliquely extending in a right-lower direction, a portion obliquely extending in a left-upper direction, and a portion obliquely extending in a left-lower direction. As described above, inclined directions of the liquid crystal molecules in each portion in which the plurality of branch electrodes 194 extend in the different directions are different from each other. Accordingly, four domains in which the inclination directions of the liquid crystal molecules are different are formed in the liquid crystal layer 3. As described above, when the inclined directions of the liquid crystal molecules are varied, a reference viewing angle of the liquid crystal display may increase.

The first subpixel electrode 191a and the second subpixel electrode 191b are divided into a plurality of sub-regions by the plate shape portion 193 having the rhombus shape and the plurality of branch electrodes 194 extending from the plate shape portion 193 in four directions.

An area of the second subpixel electrode 191b may be larger than an area of the first subpixel electrode 191a.

The first connecting member 92a connects the first extensions 132a of the first reference voltage line 131a, which are disposed at the upper and lower sides in a pixel column direction with the gate line 121 disposed therebetween. The second connecting member connects the second extensions of the second reference voltage lines 131b, which are disposed at the adjacent pixel areas.

The shielding electrode 88 overlaps the data line 171 and extends substantially parallel to the data line 171. The shielding electrode 88 is applied with a voltage having substantially the same magnitude as the common voltage. Therefore, a voltage difference is not generated between the shielding electrode 88 and the common electrode 270, and the liquid crystal molecules positioned at the position overlapping the shielding electrode 88 therefore maintain the initial state. Accordingly, an irregular movement of the liquid crystal molecules that may be generated near the data line 171 may be reduced or prevented, thereby reducing or preventing display quality deterioration such as, for example, light leakage.

The third transverse portion 134a, the fourth transverse portion 134b, the first longitudinal portion 135a, and the second longitudinal portion 135b of the first reference voltage line 131a and the second reference voltage line 131b overlap the plate shape portion 193 of the first subpixel electrode 191a and the second subpixel electrode 191b. Accordingly, while increasing storage capacitance of the storage capacitor, the first reference voltage and the second reference voltage applied as the voltages having different polarities to the first reference voltage line 131a and the second reference voltage line 131b may be prevented from influencing the common voltage of the common electrode 270.

The first gate electrode 124a, the first semiconductor 154a, the first source electrode 173a, and the first drain electrode 175a form a first switching element Qa, the second gate electrode 124b, the second semiconductor 154b, the second source electrode 173b, and the second drain electrode 175b form a second switching element Qb, and the third gate electrode 124c, the third semiconductor 154c, the third source electrode 173c, and the third drain electrode 175c forms a third switching element Qc.

The upper panel 200 will now be described herein.

A light blocking member 220 is positioned on a second insulation substrate 210. A plurality of color filters 230 are disposed on the second insulation substrate 210 and light blocking member 220. An overcoat layer 250 is disposed on the color filter 230. In exemplary embodiments, the overcoat layer 250 may be omitted. The common electrode 270 is disposed on the overcoat layer 250.

The common electrode 270 has a cross-shaped cutout 271 formed at the position corresponding to each sub-region of the first subpixel electrode 191a and the second subpixel electrode 191b, which includes a transverse cutout 71 substantially parallel to the gate line 121 and a longitudinal stem 72 substantially parallel to the data line 171.

Referring to the layout view of FIG. 9, each sub-region of the first subpixel electrode 191a and the second subpixel electrode 191b is divided into four regions by the cross-shaped cutout 271 of the common electrode 270 and a plurality of branch electrodes 194 of the pixel electrode 191a and 191b.

As described above, the third transverse portion 134a, the fourth transverse portion 134b, the first longitudinal portion 135a, and the second longitudinal portion 135b of the first reference voltage line 131a and the second reference voltage line 131b overlap the plate shape portion 193 of the first subpixel electrode 191a and the second subpixel electrode 191b, and are formed at the position overlapping the cross-shaped cutout 271 of the common electrode 270. Accordingly, while maintaining the storage capacitance of the storage capacitor of the liquid crystal display, the first reference voltage and the second reference voltage applied as the voltages having different polarities to the first reference voltage line 131a and the second reference voltage line 131b may be prevented from influencing the common voltage of the common electrode 270, and aperture ratio deterioration by the third transverse portion 134a, the fourth transverse portion 134b, the first longitudinal portion 135a, and the second longitudinal portion 135b of the first reference voltage line 131a and the second reference voltage line 131b may be reduced or prevented.

While the present invention has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A liquid crystal display, comprising:
   a first substrate;
   a gate line disposed on the first substrate;
   a data line disposed on the first substrate;
   a first reference voltage line disposed on the first substrate and applying a first reference voltage;
   a second reference voltage line disposed on the first substrate and applying a second reference voltage;
   a first subpixel electrode and a second subpixel electrode disposed in one pixel area;
   a first switching element connected to the gate line, the data line, and the first subpixel electrode;
   a second switching element connected to the gate line, the data line, and the second subpixel electrode;
   a third switching element connected to the gate line, the first subpixel electrode, and one of the first reference voltage line and the second reference voltage line;
   a second substrate facing the first substrate; and
   a common electrode formed on the second substrate and applied with the common voltage,
   wherein the first subpixel electrode and the second subpixel electrode each comprise a plate portion and a plurality of branch electrodes extending from the plate portion,
   the first reference voltage line comprises a transverse portion overlapping the plate portion of the first subpixel electrode,
   the second reference voltage line comprises a transverse portion overlapping the plate portion of the second subpixel electrode,
   the common electrode has a cross-shaped cutout, the transverse portion of the first reference voltage line extends in a same direction as a first transverse cutout of the cross-shaped cutout and overlaps the first transverse cutout, and the transverse portion of the second reference voltage line extends in a same direction as a second transverse cutout of the cross-shaped cutout and overlaps the second transverse cutout, and
   a voltage difference between the first subpixel electrode and a common voltage is larger than a voltage difference between the second subpixel electrode and the common voltage.

2. The liquid crystal display of claim 1, further comprising:
   a shielding electrode formed on the first substrate, overlapping the data line, extending parallel to the data line, and applied with a voltage having a same magnitude as the common voltage.

3. The liquid crystal display of claim 2, wherein the first reference voltage or the second reference voltage applied to the reference voltage line from among the first and second reference voltage lines that is connected to the third switching element, and a data voltage applied to the data line, have a same polarity as the common voltage.

4. The liquid crystal display of claim 3, wherein polarities of the first and second reference voltages have a predetermined magnitude and are changed for each frame.

5. The liquid crystal display of claim 1, further comprising:
   a shielding electrode formed on the first substrate, overlapping the data line, extending parallel to the data line, and applied with a voltage having a same magnitude as the common voltage.

6. The liquid crystal display of claim 5, wherein the first reference voltage or the second reference voltage applied to the reference voltage line from among the first and second reference voltage lines that is connected to the third switching element, and a data voltage applied to the data line, have a same polarity as the common voltage.

7. The liquid crystal display of claim 6, wherein polarities of the first and second reference voltages have a predetermined magnitude and are changed for each frame.

8. The liquid crystal display of claim 1, wherein the first reference voltage or the second reference voltage applied to the reference voltage line from among the first and second reference voltage lines that is connected to the third switching element, and a data voltage applied to the data line, have a same polarity as the common voltage.

9. The liquid crystal display of claim 8, wherein polarities of the first and second reference voltages have a predetermined magnitude and are changed for each frame.

10. A liquid crystal display, comprising:
    a first substrate;
    a gate line disposed on the first substrate;
    a data line disposed on the first substrate;
    a first reference voltage line disposed on the first substrate and applying a first reference voltage;
    a second reference voltage line disposed on the first substrate and applying a second reference voltage;
    a first subpixel electrode and a second subpixel electrode disposed in one pixel area;
    a first switching element connected to the gate line, the data line, and the first subpixel electrode;
    a second switching element connected to the gate line, the data line, and the second subpixel electrode;
    a third switching element connected to the gate line, the first subpixel electrode, and one of the first reference voltage line and the second reference voltage line;
    a second substrate facing the first substrate; and
    a common electrode formed on the second substrate and applied with a common voltage,
    wherein the first subpixel electrode and the second subpixel electrode each comprise a plate portion and a plurality of branch electrodes extending from the plate portion,
    the first reference voltage line comprises a transverse portion overlapping the first subpixel electrode and a cross-shaped cutout of the common electrode in a center portion of the first subpixel electrode,
    the second reference voltage line comprises a transverse portion overlapping the second subpixel electrode and the cross-shaped cutout of the common electrode in a center portion of the second subpixel electrode, and
    a voltage difference between the first subpixel electrode and the common voltage is larger than a voltage difference between the second subpixel electrode and the common voltage.

11. The liquid crystal display of claim 10, further comprising:

a shielding electrode formed on the first substrate, overlapping the data line, extending parallel to the data line, and applied with a voltage having a same magnitude as the common voltage.

12. The liquid crystal display of claim 11, wherein the first reference voltage or the second reference voltage applied to the reference voltage line from among the first and second reference voltage lines that is connected to the third switching element, and a data voltage applied to the data line, have a same polarity as the common voltage.

13. The liquid crystal display of claim 12, wherein polarities of the first and second reference voltages have a predetermined magnitude and are changed for each frame.

14. The liquid crystal display of claim 10, wherein the first reference voltage or the second reference voltage applied to the reference voltage line from among the first and second reference voltage lines that is connected to the third switching element, and a data voltage applied to the data line, have a same polarity as the common voltage.

15. The liquid crystal display of claim 14, wherein polarities of the first and second reference voltages have a predetermined magnitude and are changed for each frame.

16. The liquid crystal display of claim 1, wherein the transverse portion of the first reference voltage line overlaps the first transverse cutout in a center portion of the first subpixel electrode, and the transverse portion of the second reference voltage line overlaps the second transverse cutout in a center portion of the second subpixel electrode.

* * * * *